United States Patent
Atluri et al.

(10) Patent No.: US 11,929,615 B2
(45) Date of Patent: Mar. 12, 2024

(54) ARCHITECTURE OF RENEWABLE ENERGY ECOSYSTEM

(71) Applicant: GM GLOBAL TECHNOLOGY OPERATIONS LLC, Detroit, MI (US)

(72) Inventors: Venkata Prasad Atluri, Novi, MI (US); Ian J. Sutherland, Grosse Pointe, MI (US); Paul M. Najt, Bloomfield Hills, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 170 days.

(21) Appl. No.: 17/669,498

(22) Filed: Feb. 11, 2022

(65) Prior Publication Data

US 2023/0261469 A1     Aug. 17, 2023

(51) Int. Cl.
| | |
|---|---|
| H02J 3/00 | (2006.01) |
| B60L 53/00 | (2019.01) |
| H01M 10/44 | (2006.01) |
| H01M 16/00 | (2006.01) |
| H02J 3/38 | (2006.01) |
| H02J 7/00 | (2006.01) |
| H02J 7/35 | (2006.01) |

(52) U.S. Cl.
CPC .............. *H02J 3/007* (2020.01); *B60L 53/00* (2019.02); *H01M 10/441* (2013.01); *H01M 16/006* (2013.01); *H02J 3/381* (2013.01); *H02J 7/0013* (2013.01); *H02J 7/0047* (2013.01); *H02J 7/0063* (2013.01); *H02J 7/35* (2013.01); *H01M 2220/10* (2013.01); *H01M 2220/20* (2013.01); *H02J 2207/20* (2020.01); *H02J 2300/24* (2020.01); *H02J 2300/30* (2020.01)

(58) Field of Classification Search
CPC .......... H02J 3/007; H02J 3/381; H02J 7/0013; H02J 7/0047; H02J 7/0063; H02J 7/35; H02J 2207/20; H02J 2300/24; H02J 2300/30; H02J 2300/20; H02J 2300/28; H02J 2310/48; H02J 3/32; H02J 3/322; H02J 7/34; B60L 53/00; B60L 3/00; B60L 53/52; B60L 53/54; B60L 53/53; B60L 53/51; B60L 53/63; H01M 10/441; H01M 16/006; H01M 2220/10; H01M 2220/20
USPC .............................................................. 307/3
See application file for complete search history.

(56) References Cited

U.S. PATENT DOCUMENTS

| | | | |
|---|---|---|---|
| 10,183,583 B2 * | 1/2019 | Narla | H02M 7/44 |
| 2013/0099720 A1 * | 4/2013 | Chuah | H02J 7/04 |
| | | | 307/66 |
| 2017/0054134 A1 * | 2/2017 | Choi | G01R 31/36 |

(Continued)

*Primary Examiner* — Richard Tan

(57) ABSTRACT

A system includes a battery system including a plurality of batteries and configured to be selectively coupled to and charged by a renewable energy source and selectively coupled to and charged by a power grid. The system further includes a DC bus shared by a plurality of loads and an energy management system connected between the battery system and the plurality of loads. The energy management system is configured to selectively connect individual ones of the plurality of batteries to at least one of the plurality of loads via the DC bus, selectively connect the battery system to the power grid and disconnect the battery system from the power grid, and selectively connect at least one of the plurality of loads directly to the power grid.

20 Claims, 7 Drawing Sheets

(56) References Cited

U.S. PATENT DOCUMENTS

| | | | |
|---|---|---|---|
| 2021/0111717 A1* | 4/2021 | Fechalos | H02H 11/005 |
| 2021/0218248 A1* | 7/2021 | Bozchalui | H02J 7/35 |
| 2023/0185350 A1* | 6/2023 | Koerner | H05K 7/20272 |
| | | | 713/300 |

* cited by examiner

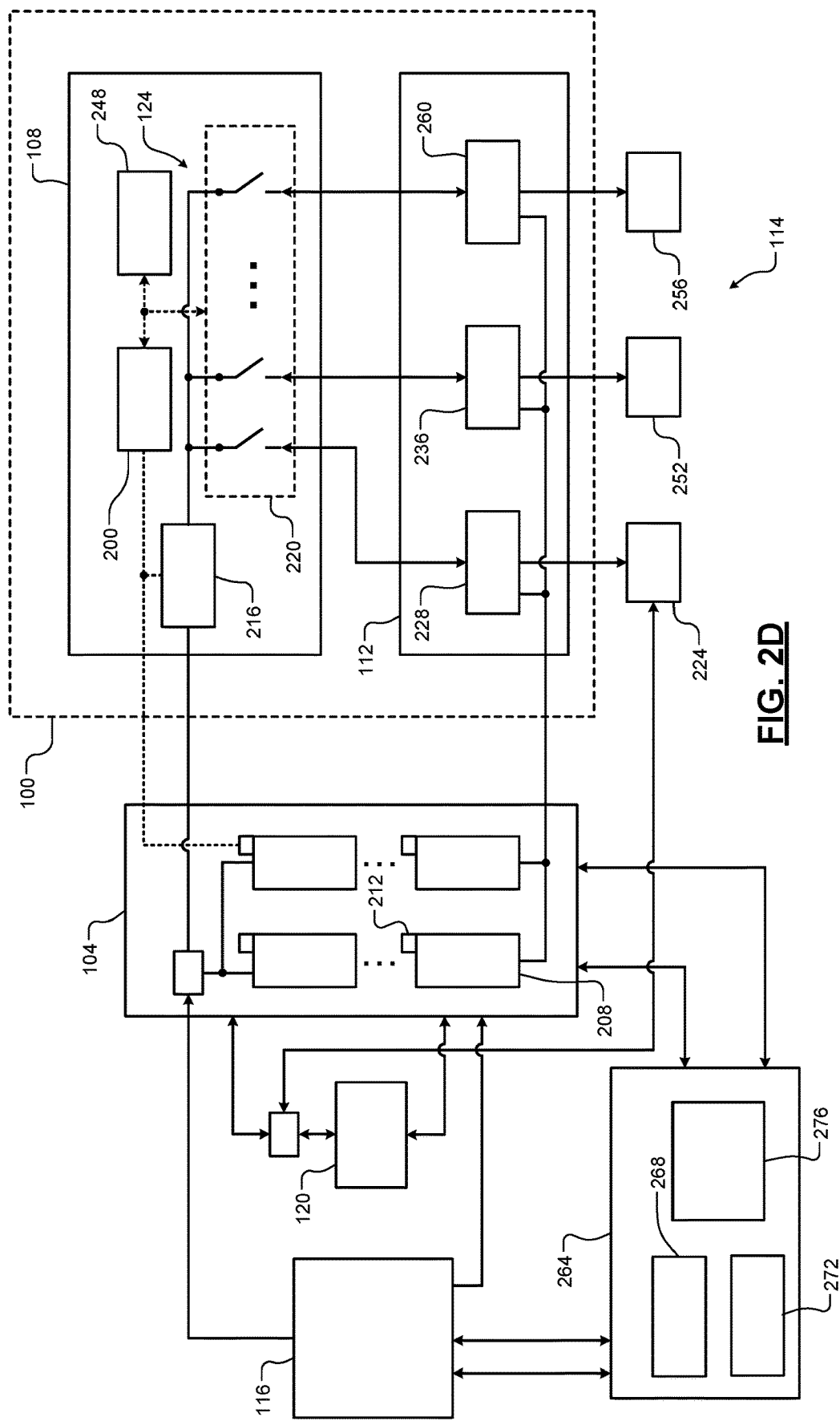

ARCHITECTURE OF RENEWABLE ENERGY ECOSYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to energy management systems for storing and providing electrical power generated by renewable energy sources.

Renewable energy sources (including, but not limited to, solar and wind power arrays) decrease reliance on conventional power grids and utilities and reduce greenhouse gas emissions. In some examples, electrical power generated by renewable energy sources may be stored in batteries and/or supplied directly to a load (e.g., an electrical system of a home, industrial or commercial buildings, etc.). In other examples, renewable energy sources may be coupled to a power grid and may supplement electrical power supplied by the power grid.

SUMMARY

A system includes a battery system including a plurality of batteries and configured to be selectively coupled to and charged by a renewable energy source and selectively coupled to and charged by a power grid. The system further includes an energy management system including a DC bus shared by a plurality of loads, a power distribution control system, and a load interface system. The energy management system is connected between the battery system and the plurality of loads. The energy management system is configured to selectively connect individual ones of the plurality of batteries to at least one of the plurality of loads via the DC bus, selectively connect the battery system to the power grid and disconnect the battery system from the power grid, and selectively connect at least one of the plurality of loads directly to the power grid.

In other features, the energy management system includes a power distribution control system configured to control a plurality of switches of a switch array connected between the battery system and the plurality of loads.

In other features, the power distribution control system includes a DC/DC converter connected between the battery system and the DC bus.

In other features, the power distribution control system includes a battery management system configured to monitor operating characteristics of respective ones of the plurality of batteries of the battery system, and the operating characteristics include at least one of a voltage, current, and temperature of the respective ones of the plurality of batteries.

In other features, the battery management system is configured to selectively disconnect the respective ones of the plurality of batteries from the plurality of loads based on the operating characteristics.

In other features, the power distribution control system includes a home power management system configured to selectively connect individual ones of the plurality of batteries to the plurality of loads.

In other features, the home power management system is configured to control individual ones of the plurality of switches to connect the battery system to respective loads of the plurality of loads.

In other features, the plurality of loads includes an electric vehicle, and the home power management system is configured to control the plurality of switches to connect the battery system to the electric vehicle via a direct current fast charging module.

In other features, the plurality of loads includes AC power main terminals of a home, and the home power management system is configured to control the plurality of switches to connect the battery system to the AC power main terminals via an inverter.

In other features, the plurality of loads includes a chargeable DC load, and the home power management system is configured to control the plurality of switches to connect the battery system to the chargeable DC load via a DC charging station.

In other features, the system further includes a switch connected between the renewable energy source and the battery system, and the energy management system is configured to control the switch to selectively connect the renewable energy source to the battery system and directly to the DC bus of the energy management system by bypassing the battery system.

In other features, the energy management system is configured to control the switch to selectively disconnect the battery system from the energy management system.

In other features, the system further includes a switch connected between the power grid and the battery system, and the energy management system is configured to control the switch to bypass the battery system and selectively connect the power grid directly to the plurality of loads.

In other features, the energy management system is configured to control the switch to disconnect the power grid from the battery system.

In other features, the renewable energy source is a solar power array.

A system includes a battery system including a plurality of batteries and configured to be selectively coupled to and charged by a renewable energy source and selectively coupled to a long-term energy management system. The system further includes a DC bus shared by a plurality of loads and an energy management system connected between the battery system and the plurality of loads. The energy management system includes an enterprise power management system configured to selectively connect individual ones of the plurality of batteries to at least one of the plurality of loads via the DC bus, selectively connect the battery system to the long-term energy management system and disconnect the battery system from the long-term energy management system, and selectively connect at least one of the plurality of loads directly to the long-term energy management system.

In other features, the renewable energy source is a solar power array.

In other features, the long-term energy management system includes a fuel cell system.

In other features, the enterprise power management system is further configured to selectively connect a power grid to the battery system.

In other features, the plurality of loads includes AC power main terminals of an industrial facility.

In other features, at least a portion of the energy management system is implemented in a cloud computing system.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2D is a functional block diagram of another example of the energy management system of FIG. 1 shown in more detail;

In the drawings, reference numbers may be reused to identify similar and/or identical elements.

DETAILED DESCRIPTION

As capacity and efficiency of renewable energy sources increase, storage, load balancing, and a relationship with the power grid become more complex. Further, a conventional interconnection with the power grid may be undesirable due to lack of power grid reliability, energy cost fluctuation, etc.

Systems and methods according to the present disclosure implement an energy management system configured to supply stored electricity (e.g., received from a renewable energy source such as a solar power array) from a battery system to an array of loads, which may include an electric vehicle. For example, the battery system provides electrical power to the loads using a common direct current (DC) bus. The battery system is configured to supply both DC power to DC loads and alternating current (AC) power to AC loads (e.g., via an inverter). The DC bus is isolated from the power grid to minimize the effects of power grid variation and outages.

The battery system includes an array of batteries or battery modules each comprised of a plurality of cells. Individual battery modules or cells may be switched on and off (i.e., connected and disconnected) to add or remove battery capacity based on system requirements. The battery system may implement wireless communication to facilitate battery switching and scalability.

Figure 1:
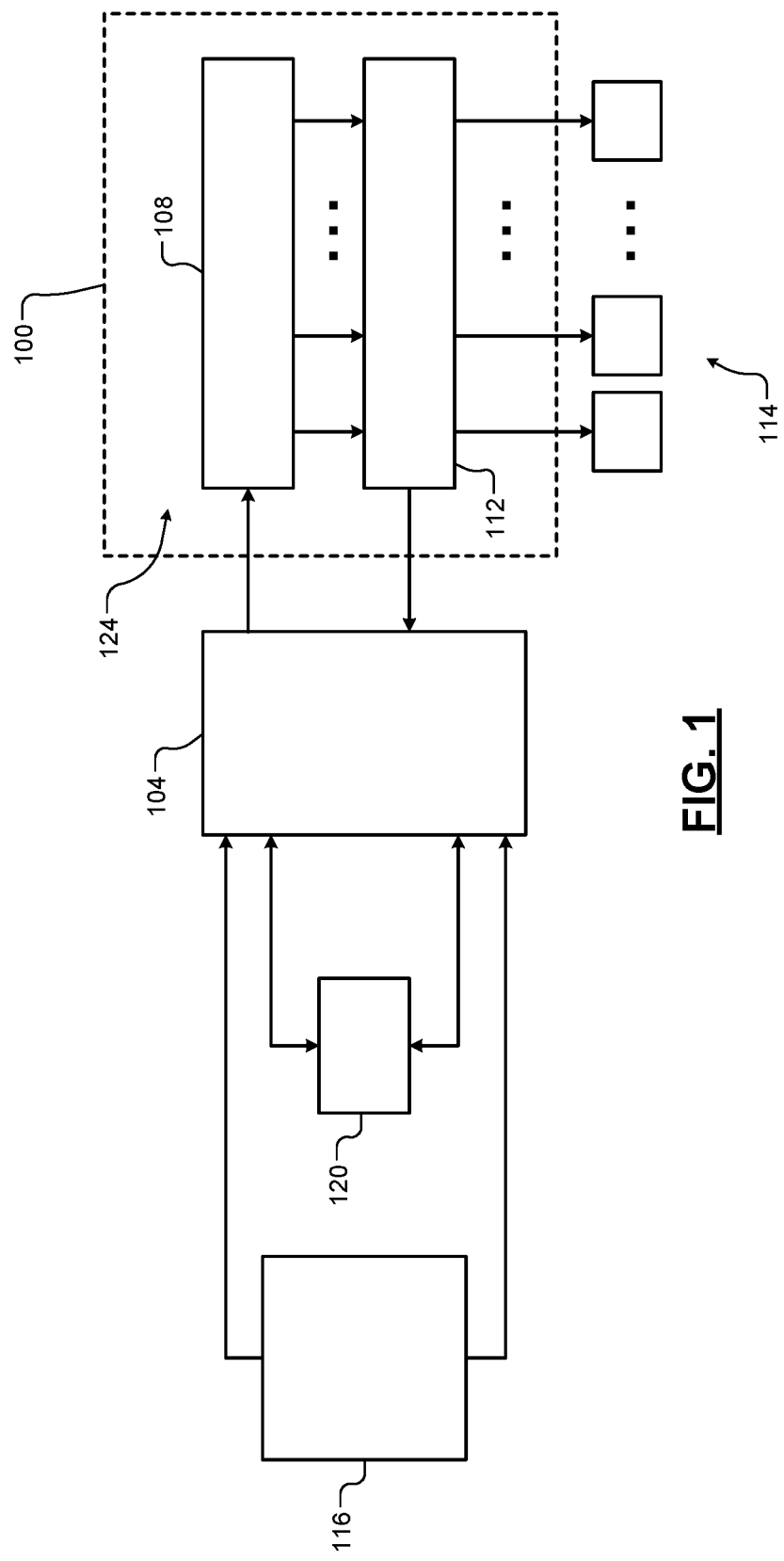
FIG. 1 is a functional block diagram of an example energy management system according to the present disclosure.

FIG. 1 shows an example energy management system 100 according to the present disclosure. In some examples, at least a portion of the energy management system 100 may be implemented in a cloud computing system. The energy management system 100 is connected to a battery system 104 and includes a power distribution control system 108 and a load interface system 112. The energy management system 100 is configured to supply electrical power stored in the battery system 104 to an array of loads 114. For example only, the electrical power stored in the battery system 104 is supplied primarily from a renewable energy source, such as a solar power array 116.

The battery system 104 may also be configured to selectively receive power from a power grid 120. The energy management system 100 is configured to maximize use of electrical power received from the solar power array 116 while minimizing reliance on the power grid 120. Although described herein as a solar power array 116, the renewable energy source may include other energy sources (e.g., wind-generated power) and/or combinations thereof. Accordingly, the architecture of the energy management system 100 and the battery system 104 is configured for compatibility at least with one renewable energy source separate from the power grid 120. In some examples, the architecture is compatible with at least the power grid 120 and one or more different renewable energy sources separate from the power grid 120.

The loads 114 may include both loads that are configured to receive AC power and loads that are configured to receive DC power. For example, the loads 114 include, but are not limited to, main power terminals of a home, an electric vehicle, a DC charging station, etc.

The energy management system 100 includes a DC bus 124 configured to supply power from the battery system 104 to the loads. The DC bus 124 may be isolated from the power grid 120 (e.g., using one or more switches as described below in more detail) to minimize the effects of power grid variation, outages, etc. For example, the power distribution control system 108 is configured to selectively connect the battery system 104 to one or more of the loads 114 via the load interface system 112 to supply electrical power from the battery system 104.

Figure 2A:
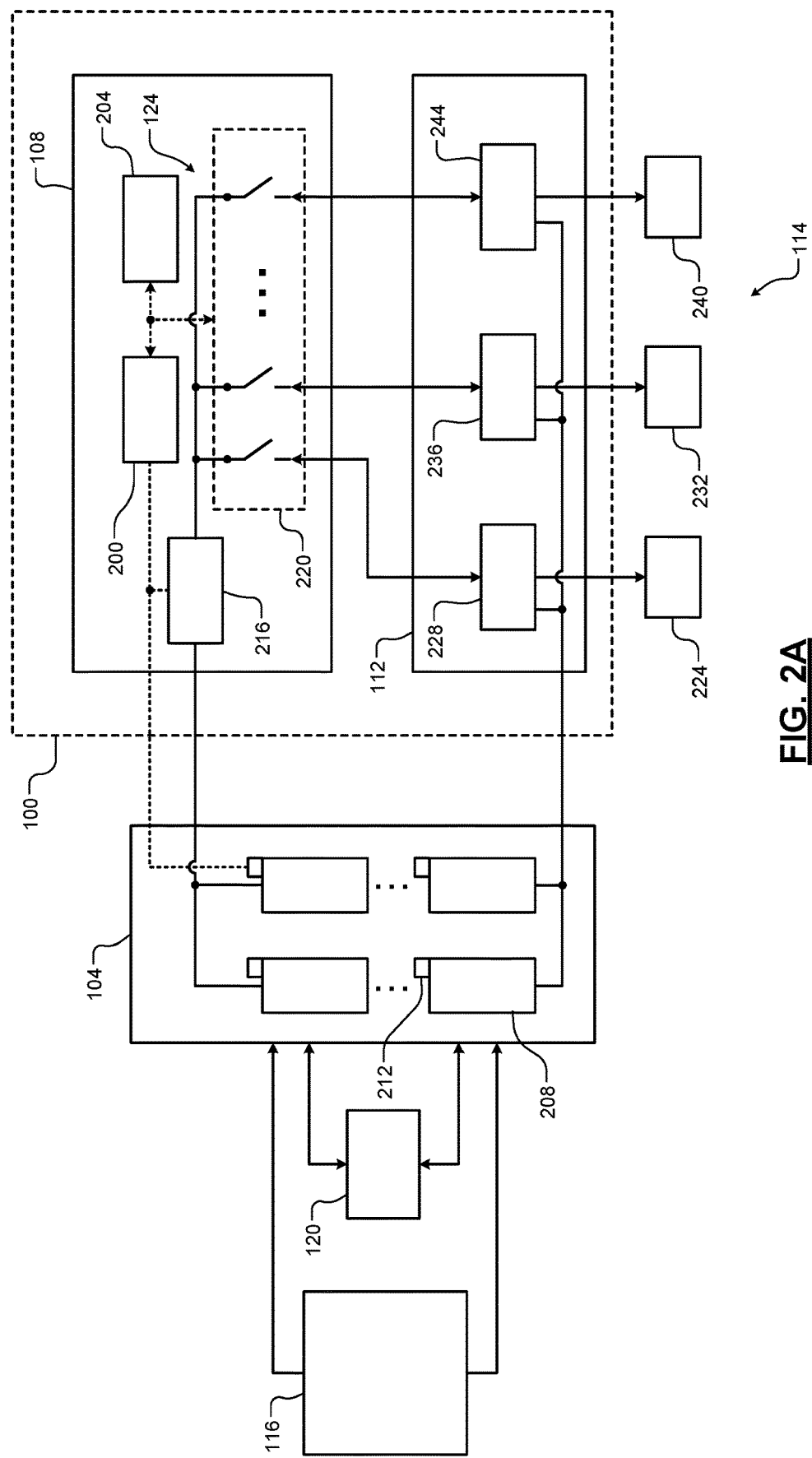
FIG. 2A is a functional block diagram of an example of the energy management system of FIG. 1 shown in more detail.

Referring now to FIG. 2A, an example of the energy management system 100 (e.g., configured fora residential application, such as a home) according to the present disclosure is shown in more detail. For example, the power distribution control system 108 includes a battery management system (BMS) 200 and a home power management system (HPMS) 204. The power distribution control system 108 may be implemented as an electrical power meter located external to a home or building.

The BMS 200 is configured to perform battery management operations, which may include monitoring individual cells or batteries 208 of the battery system 104 and controlling supply of power from the battery system 104. In some examples, the BMS 200 monitors voltages, temperatures, power levels, and current levels of respective batteries 208 and determines various operating parameters of the batteries 208 accordingly. For example, the BMS 200 may determine operating parameters including, but not limited to, instantaneous charge and discharge power and current limits, short term charge and discharge power and current limits, continuous charge and discharge power and current limits, minimum and maximum voltages, minimum and maximum operating temperatures, etc.

In some examples, each battery 208 includes a monitoring and communication interface, such as a cell monitoring module 212. For example, the cell monitoring module 212 includes and/or communicates with various sensors configured to monitor and measure operating characteristics of the battery 208 (e.g., voltage, current, temperature, etc.). Each of the cell monitoring modules 212 communicates (e.g., wirelessly) with the BMS 200 to provide the BMS 200 with the measured operating characteristics. The BMS 200 in turn is configured to selectively connect or disconnect individual ones of the batteries 208 to add or remove battery capacity based on system requirements, diagnose faults in the batteries 208, etc. For example, the BMS 200 is configured to detect and selectively isolate a faulty battery.

As shown, the power distribution control system 108 may include a DC/DC converter 216 configured to convert (e.g., step down) a DC voltage supplied by the battery system 104 and provided to the loads 114. The DC/DC converter 216 may be configured to operate based on control signals received from the BMS 200 (e.g., via a wireless communication interface).

The HPMS 204 controls individual switches (e.g., S1, S2, and S3) of a switch array 220 to selectively connect and supply electrical power from the battery system 104 to the loads 114 via the load interface system 112. For example, the HPMS 204 controls the switch S1 to selectively connect the battery system 104 to one or more electric vehicles (EVs) 224 via a direct current fast charging (DCFC) module 228. The HPMS 204 controls the switch S2 to selectively connect the battery system 104 to AC power mains (home mains) 232 via an inverter 236 configured to convert DC power to AC power. The HPMS 204 controls the switch S3 to selectively connect the battery system 104 to DC loads (e.g., DC power tools 240, batteries or battery charging stations, etc.) via a DC charging bay 244. Additional switches can be selectively added to the switch array 220 as needed.

In this manner, the HPMS 204 is configured to selectively supply power from the battery system 104 to the loads 114, and one or more of the loads 114 can be isolated from battery system 104, the power grid 120, and/or the solar power array 116. Further, in some examples, each of the BMS 200 and the HPMS 204 may independently control switching of the switch array 220.

In the example shown in FIG. 2A, neither the solar power array 116 nor the power grid 120 is directly connected to the loads 114, and, in particular, to the home mains 232. Rather, the solar power array 116 and the power grid 120 are connected to the battery system 104 and the power distribution control system 108 selectively connects one or more batteries 208 of the battery system 104 to the solar power array 116 and the power grid 120, and to the loads 114. For example, the battery system 104 may generally be connected to the solar power array 116 to charge the battery system 104 and disconnected from the power grid 120. In other words, the DC bus 124 is isolated from the power grid 120 to minimize the effects of power grid variation and outages, minimize reliance on the power grid 120, and maximize use of electrical power supplied from the solar power array 116.

The power distribution control system 108 may selectively connect the battery system 104 to the power grid 120 (e.g., to supplement charging of the battery system 104, in response to a charge level of the battery system 104 decreasing below a predetermined threshold, in response to determining that insufficient current is being provided from the solar power array 116, etc.).

Figure 2B:
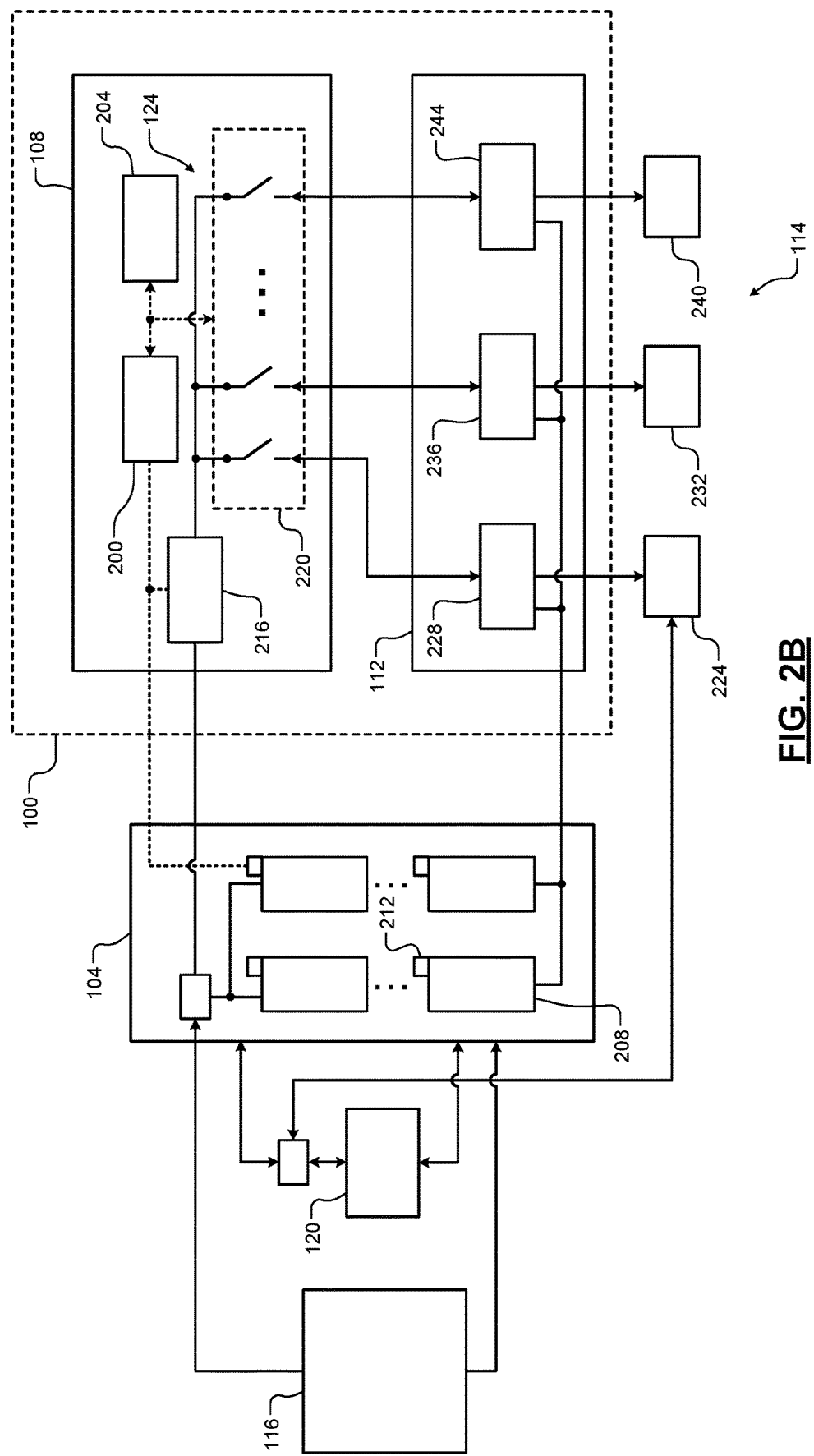
FIG. 2B is a functional block diagram of another example of the energy management system of FIG. 1 shown in more detail.

In an example shown in FIG. 2B, the solar power array 116 and/or the power grid 120 can be directly connected to the energy management system 100 and/or the loads 114 by bypassing the battery system 104 (e.g., in response to detecting a fault with the battery system 104). For example, a switch S4 can be controlled (e.g., by the BMS 200 and/or the HPMS 204) to disconnect the power grid 120 from the battery system 104, and/or to directly connect the power grid 120 to one or more of the loads 114.

Similarly, a switch S5 connected between the solar power array 116 and the energy management system 100 can be controlled (e.g., by the BMS 200 and/or the HPMS 204) to selectively disconnect the battery system 104 and instead directly connect the solar power array 116 to the energy management system 100. Conversely, the switch S5 can be controlled to connect the solar power array 116 to the battery system 104 to charge the batteries 208.

Figure 2C:
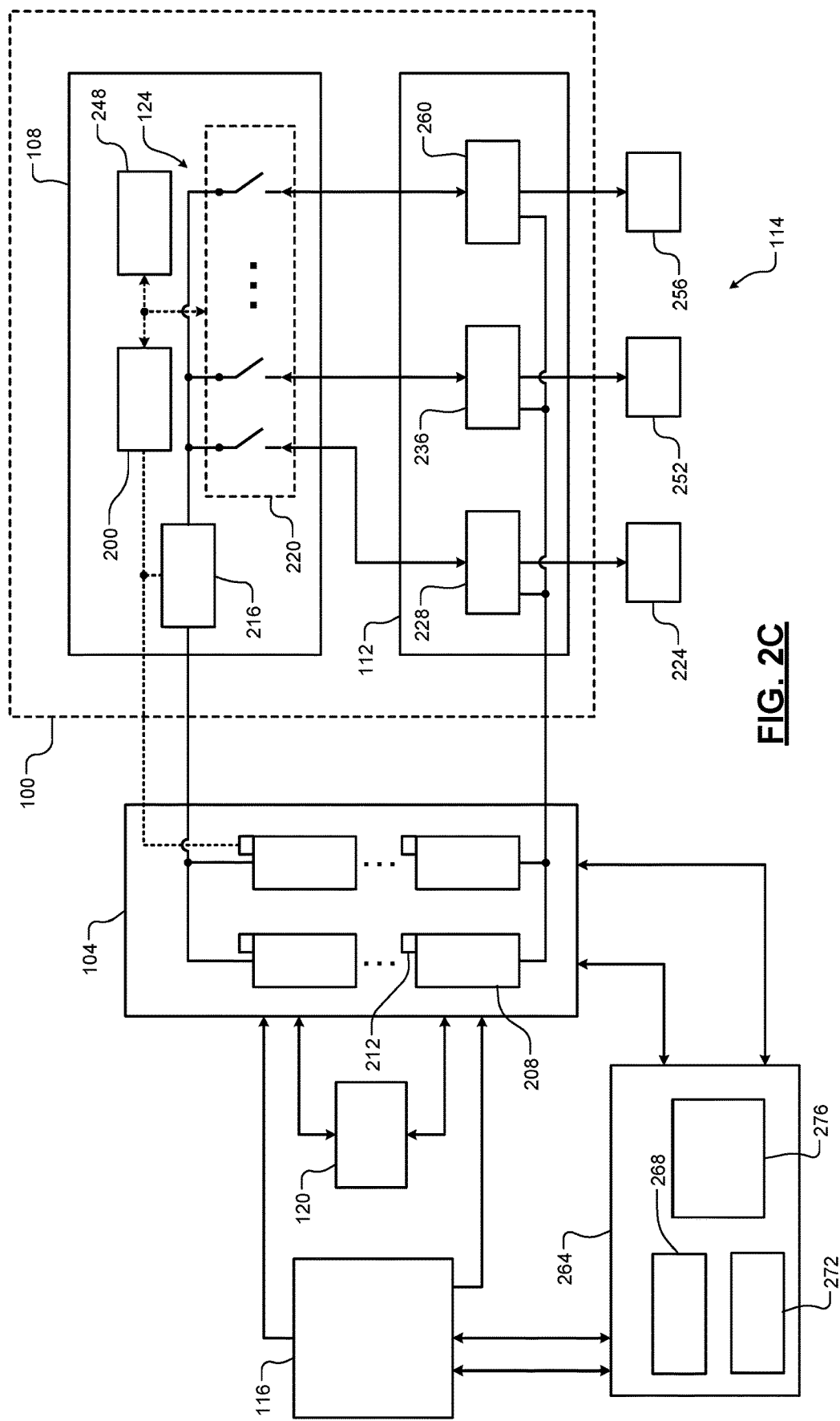
FIG. 2C is a functional block diagram of another example of the energy management system of FIG. 1 shown in more detail.

In an example shown in FIG. 2C, the energy management system 100 is configured for an industrial or commercial application. For example, instead of the HPMS 204, the power distribution control system 108 includes an enterprise power management system (EPMS) 248. The power distribution control system 108 may be implemented as an electrical power meter located external to an industrial or commercial facility, in a dedicated utility room or building, etc. The EPMS 248 is configured to control supply of power from the battery system to the loads 114 and selectively connect and disconnect the solar power array 116 and/or the power grid 120 in a manner similar to the HPMS 204 as described above. In this manner, the power distribution control system 108 is configured to selectively supply electrical power from the battery system 104 to the loads 114 via the common DC bus 124.

In this example, the loads 114 include the EVs 224, facility or building mains 252, and other DC loads 256 (e.g., industrial or manufacturing equipment, data servers, etc.). For example only, the load interface system 112 includes a DC load circuit 260 configured to supply electrical power received from the power distribution control system 108 to the DC loads 256.

The battery system 104 may correspond to short-term storage for electrical power received from the solar power array 116. Conversely, the battery system 104 and/or the power distribution control system 108 may also be connected to a long-term storage system 264 (i.e., a system configured to store a greater amount of electrical power or the same amount of electrical power for a greater period than the battery system 104). As one example, the long-term storage system 264 is implemented as a fuel cell electrical power storage system and includes an electrolyzer 268, hydrogen storage 272, and a fuel cell system 276. In other examples, the long-term storage system 264 implements a turbine-powered system. In some examples, the long-term energy management system 264 may be omitted. In other examples, the energy management system 100 may be connected to two or more of the battery systems 104, which each can be individually connected to and disconnected from the energy management system 100.

In an example shown in FIG. 2D, the system shown in FIG. 2C may be configured to implement the switches S4 and S5 as described in FIG. 2B. For example, the solar power array 116 and/or the power grid 120 can be directly connected to the energy management system 100 and/or the loads 114 by bypassing the battery system 104 (e.g., in response to detecting a fault with the battery system 104). For example, a switch S4 can be controlled (e.g., by the BMS 200 and/or the EPMS 248) to disconnect the power grid 120 from the battery system 104, and/or to directly connect the power grid 120 to one or more of the loads 114.

Similarly, a switch S5 connected between the solar power array 116 and the energy management system 100 can be controlled (e.g., by the BMS 200 and/or the EPMS 248) to selectively disconnect the battery system 104 and instead directly connect the solar power array 116 to the energy management system 100. Conversely, the switch S5 can be controlled to connect the solar power array 116 to the battery system 104 to charge the batteries 208. In some examples, the long-term energy management system 264 can be selectively connected directly to the power distribution control system 108 and/or the loads 114 to bypass the battery system 104.

Figure 2E:
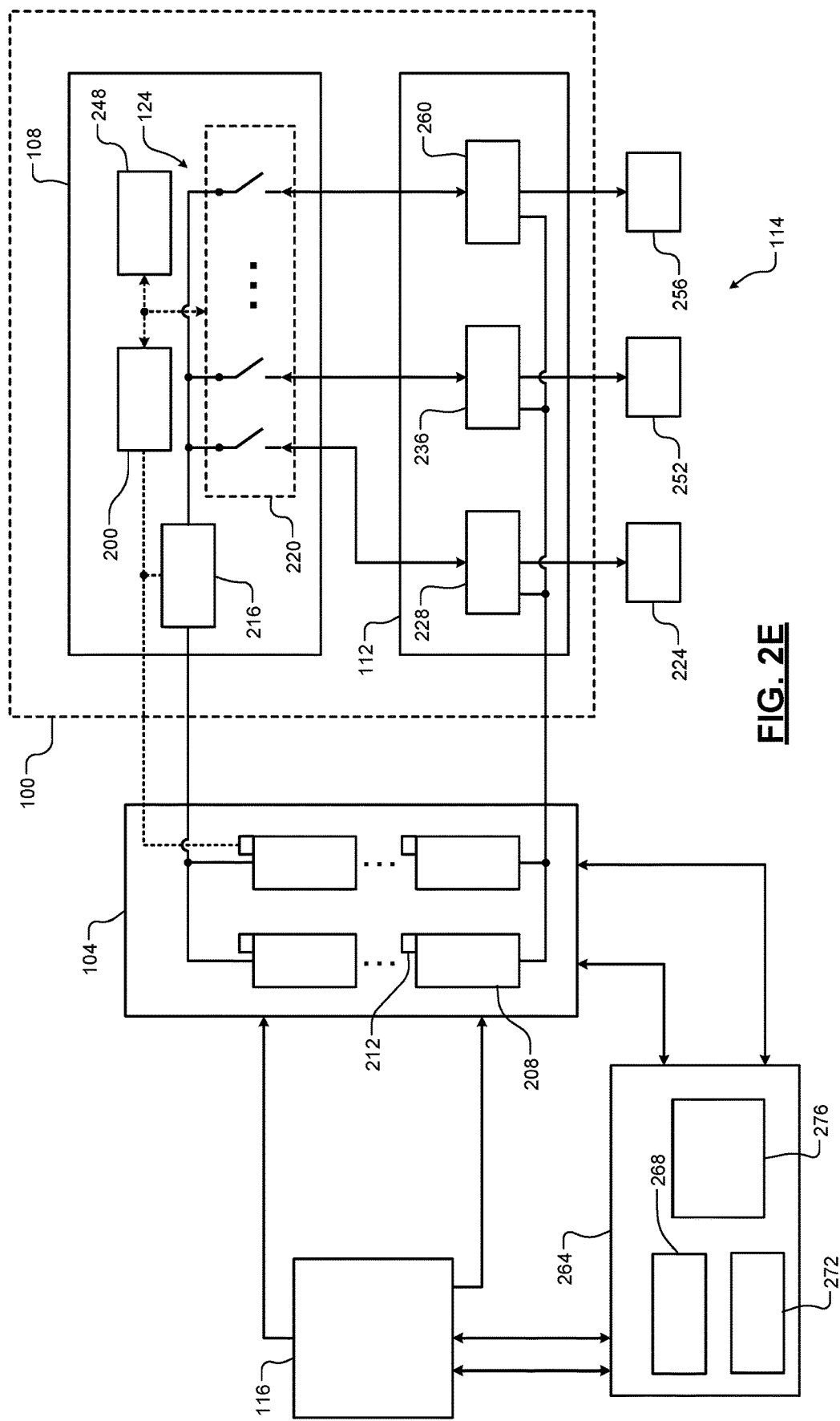
FIG. 2E is a functional block diagram of another example of the energy management system of FIG. 1 shown in more detail.
Figure 2F:
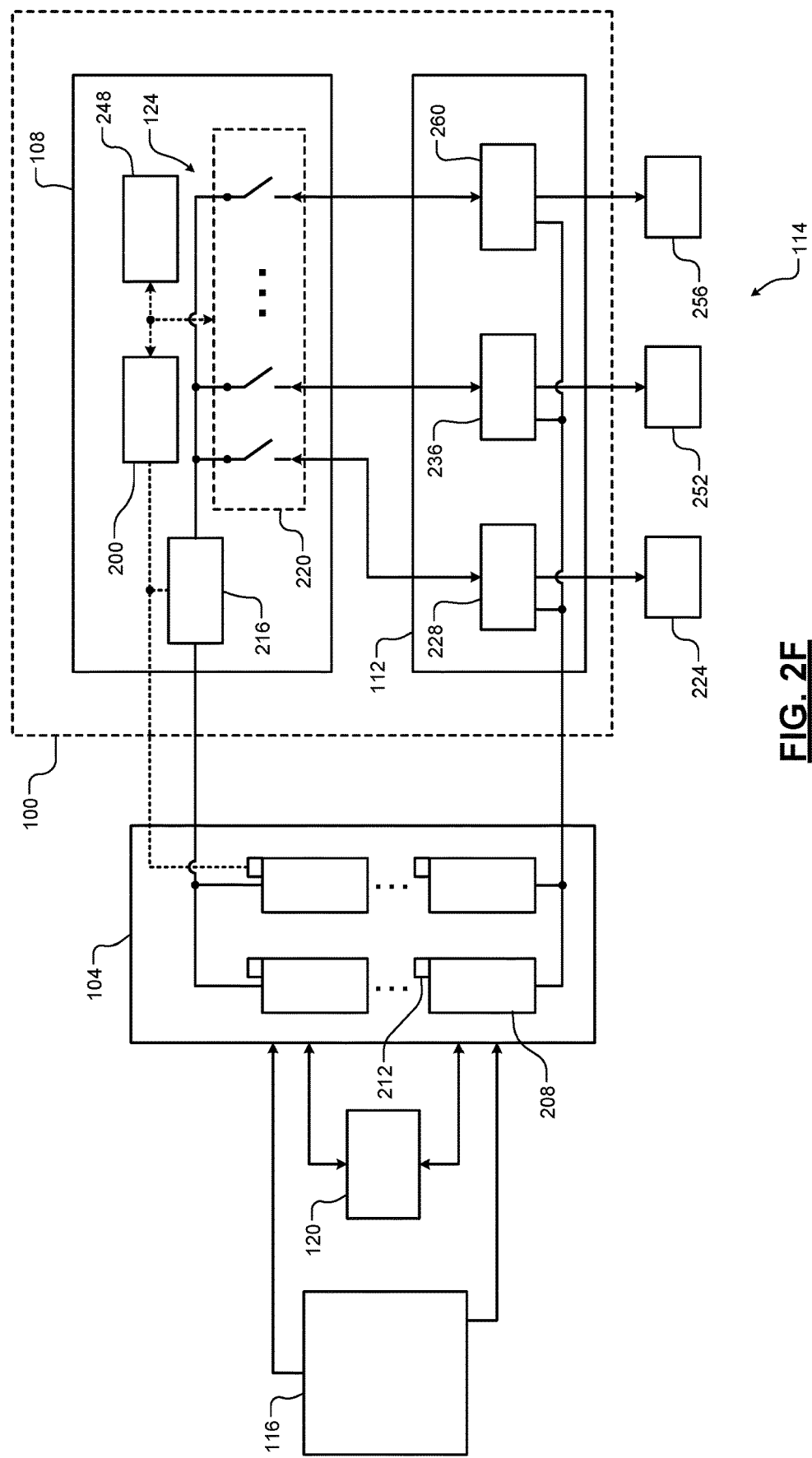
FIG. 2F is a functional block diagram of another example of the energy management system of FIG. 1 shown in more detail.

In an example shown in FIG. 2E, the battery system 104 and the power distribution control system 108 are not connected to the power grid 120. In an example shown in FIG. 2F, the battery system 104 and the power distribution control system 108 are connected to the power grid 120 but are not connected to the long-term energy management system 264.

In any of the examples described above, the energy management system 100 may be configured to determine whether an energy source connected to the energy management system 100 is a renewable energy source and selectively connect to and receive power from an energy source accordingly. For example, the energy management system 100 may identify renewable energy sources based on user or other inputs, data encoded into received power signals, and/or other detected characteristics of the power signals, etc.

In other examples, the energy management system 100 may be configured to select between energy sources (e.g., the power grid, one or more renewable energy sources, etc.) based on factors including, but not limited to, user preferences or settings, availability of renewable energy from connected renewable energy sources, a determination of whether energy sources other than the power grid are available, etc.

In other examples, the energy management system 100 is configured to selectively operate using renewable energy sources based on respective characteristics of different renewable energy sources and associated preparation. For example, some energy sources may only be available during certain times of the day (e.g., solar energy availability during daylight hours but not nighttime hours), based on external or environmental conditions, etc. In this manner, the energy management system 100 may predict whether energy will be available from certain energy sources and switch between the power grid and renewable energy sources accordingly.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system, comprising:
a battery system including a plurality of batteries, wherein the battery system is configured to be (i) selectively coupled to and charged by a renewable energy source and (ii) selectively coupled to and charged by a power grid;
a DC bus shared by a plurality of loads;
an energy management system connected between the battery system and the plurality of loads, wherein the energy management system is configured to:
selectively connect individual ones of the plurality of batteries to at least one of the plurality of loads via the DC bus,
selectively connect the battery system to the power grid and disconnect the battery system from the power grid, and
selectively connect at least one of the plurality of loads directly to the power grid; and
a switch connected between the renewable energy source and the battery system, wherein the energy management system is configured to control the switch to selectively connect the renewable energy source (i) to the battery system and (ii) directly to the energy management system by bypassing the battery system.

2. The system of claim 1, wherein the energy management system includes a power distribution control system configured to control a plurality of switches of a switch array connected between the battery system and the plurality of loads.

3. The system of claim 2, wherein the power distribution control system includes a DC/DC converter connected between the battery system and the DC bus.

4. The system of claim 2, wherein the power distribution control system includes a battery management system configured to monitor operating characteristics of respective ones of the plurality of batteries of the battery system, and wherein the operating characteristics include at least one of a voltage, current, and temperature of the respective ones of the plurality of batteries.

5. The system of claim 4, wherein the battery management system is configured to selectively disconnect the respective ones of the plurality of batteries from the plurality of loads based on the operating characteristics.

6. The system of claim 2, wherein the power distribution control system includes a home power management system configured to selectively connect individual ones of the plurality of batteries to the plurality of loads.

7. The system of claim 6, wherein the home power management system is configured to control individual ones of the plurality of switches to connect the battery system to respective loads of the plurality of loads.

8. The system of claim 7, wherein the plurality of loads includes an electric vehicle, and wherein the home power management system is configured to control the plurality of switches to connect the battery system to the electric vehicle via a direct current fast charging module.

9. The system of claim 7, wherein the plurality of loads includes AC power main terminals of a home, and wherein the home power management system is configured to control the plurality of switches to connect the battery system to the AC power main terminals via an inverter.

10. The system of claim 7, wherein the plurality of loads includes a chargeable DC load, and wherein the home power management system is configured to control the plurality of switches to connect the battery system to the chargeable DC load via a DC charging station.

11. The system of claim 1, wherein the energy management system is configured to control the switch to selectively disconnect the battery system from the energy management system.

12. The system of claim 1, further comprising a switch connected between the power grid and the battery system, wherein the energy management system is configured to control the switch to bypass the battery system and selectively connect the power grid directly to the plurality of loads.

13. The system of claim 12, wherein the energy management system is configured to control the switch to disconnect the power grid from the battery system.

14. The system of claim 1, wherein the renewable energy source is a solar power array.

15. A system, comprising:
a battery system including a plurality of batteries, wherein the battery system is configured to be (i) selectively coupled to and charged by a renewable energy source and (ii) selectively coupled to a long-term energy management system;
a DC bus shared by a plurality of loads; and an energy management system connected between the battery system and the plurality of loads, wherein the energy management system includes an enterprise power management system configured to:
- selectively connect individual ones of the plurality of batteries to at least one of the plurality of loads via the DC bus,
- selectively connect the battery system to the long-term energy management system and disconnect the battery system from the long-term energy management system, and
- selectively connect at least one of the plurality of loads directly to the long-term energy management system; and a switch connected between the renewable energy source and the battery system, wherein the energy management system is configured to control the switch to selectively connect the renewable energy source (i) to the battery system and (ii) directly to the energy management system by bypassing the battery system.

16. The system of claim 15, wherein at least one of:
the renewable energy source is a solar power array; and
the long-term energy management system includes at least one of a fuel cell system and a turbine-generator fueled by stored hydrogen.

17. The system of claim 15, wherein the enterprise power management system is further configured to selectively connect a power grid to the battery system.

18. The system of claim 15, wherein the plurality of loads includes AC power main terminals of an industrial facility.

19. The system of claim 15, wherein at least a portion of the energy management system is implemented in a cloud computing system.

20. The system of claim 15, wherein the energy management system includes a power distribution control system configured to control a plurality of switches of a switch array connected between the battery system and the plurality of loads.

* * * * *